United States Patent [19]

Birkle et al.

[11] Patent Number: 4,670,120

[45] Date of Patent: Jun. 2, 1987

[54] APPARATUS FOR ELECTROLYTIC SURFACE TREATMENT OF BULK GOODS

[75] Inventors: Siegfried Birkle, Hoechstadt/Aisch; Johann Gehring, Spardorf, both of Fed. Rep. of Germany

[73] Assignee: Siemens Aktiengesellschaft, Berlin and Munich, Fed. Rep. of Germany

[21] Appl. No.: 880,079

[22] Filed: Jun. 30, 1986

[30] Foreign Application Priority Data

Jul. 9, 1985 [DE] Fed. Rep. of Germany ....... 3524510

[51] Int. Cl.$^4$ .............................................. C25D 17/16
[52] U.S. Cl. ..................... 204/201; 204/222
[58] Field of Search ................... 204/201, 222, 223

[56] References Cited

U.S. PATENT DOCUMENTS

| | | | |
|---|---|---|---|
| 3,292,775 | 12/1966 | White | 198/220 |
| 3,649,490 | 3/1972 | Nolan et al. | 204/201 |
| 3,826,355 | 7/1974 | Faust | 198/220 BA |
| 4,253,916 | 3/1981 | Kobayashi et al. | 204/14.1 |
| 4,427,518 | 1/1984 | de Vries et al. | 204/201 |

FOREIGN PATENT DOCUMENTS 0070011  1/1983  European Pat. Off. ........... 204/201
594072  12/1977  Switzerland ........................ 204/201

OTHER PUBLICATIONS

Edner et al, "Neue Erkenntnisse mit dem Vibrobot-Verfahren", Galvanotechnik, V. 75, No. 11, 1984, p. 1399.

Primary Examiner—T. M. Tufariello
Attorney, Agent, or Firm—Hill, Van Santen, Steadman & Simpson

[57] ABSTRACT

An apparatus for electrolytic surface treatment of goods comprises a tank for the acceptance of a treatment bath, an arrangement for contacting the goods with one pole of an electrical source, at least one electrode arranged in the treatment bath having an opposite polarity to the polarity of the one pole which is contacting the goods being treated, a vibratory conveyor having a helically ascending conveyor track for transporting the goods through the tank, characterized by the electrode being a helically shaped electrode being positioned to be equally spaced from the surface of the conveyor track. The apparatus is particularly useful for the electro-deposition of aluminum from aprotic, oxygen-free and water-free, aluminum-organic electrolyte.

18 Claims, 3 Drawing Figures

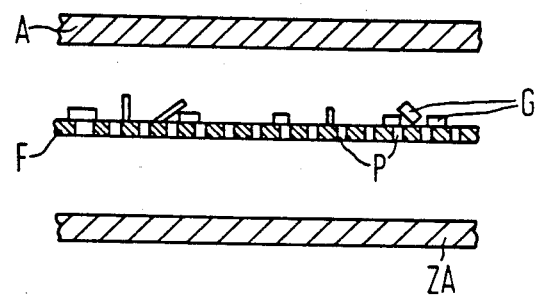

APPARATUS FOR ELECTROLYTIC SURFACE TREATMENT OF BULK GOODS

BACKGROUND OF THE INVENTION

The present invention is directed to an apparatus for electrolytic surface treatment of bulk goods, particularly for the electro deposition of aluminum from an aprotic, oxygen-free and water-free, aluminum-organic electrolyte. The apparatus comprises a tank for the acceptance of the treatment bath, an arrangement for contacting the goods with one pole of an electrical source, at least one electrode arranged in the treatment bath and having the opposite polarity of the one pole and at least one vibrator conveyor comprising a helically ascending conveyor track for transporting of the goods through the treatment bath.

Aluminum deposited from an aprotic, oxygen-free and water-free, aluminum-organic electrolyte is distinguished by its ductility, low number of pores, corrosion resistance and ability to be anodized. Since the access of air will effect a considerable diminution of the conductivity and the useful life of these electrolytes due to the reaction of the electrolytes with atmospheric oxygen and atmospheric humidity, the electro-plating must be undertaken in a treatment apparatus which operates under air exclusion or a protective atmosphere. In order for the access of air to be prevented during loading and unloading, these treatment apparatuses operating under an air exclusion utilize admission and discharge locks. These admission and discharge locks are fashioned as gas locks, as liquid locks, or as a combined gas-liquid lock and are equipped with conveyor means for conducting the goods to be treated through the locks.

U.S. Pat. No. 4,427,518, which is based on the same German application as European Patent No. 0,070,011, discloses an apparatus or facility for the electro deposition of metal, wherein bulk goods to be electro-plated are introduced into an electro-plating drum rotatably arranged in an electro-plating tank. The introduction of the goods is by an admissions station provided with conveying means. The goods are then conducted through the electro-plating drum, which is provided with a screw conveyor on an inside wall and then discharged at an exit station which is provided with a conveyor means. The electro-plating drum, which is provided with perforations, is, thereby, connected as a cathode, whereas the anode is arranged in the inside of the electro-plating drum. For the electro-deposition of aluminum from oxygen-free and water-free, aluminum-organic electrolyte, the electro-plating drum is constructed to be gas tight closeable and the space lying above the electrolyte level is charged with an inert gas. In addition, the admission and exit stations for the apparatus are additionally equipped with liquid locks.

In mass electro-plating, the bulk goods to be electro-plated must be held together during the galvanic processing so that every individual part is electrically contacted. On the other hand, the goods to be electro-plated should be spread out as far as possible so that the metal deposition can occur on as large as possible surface of the goods and an optimum uniform current density is guaranteed on all parts. Another essential precondition for achieving faultless metal coatings having a uniform layer thickness is an adequate mixing of the goods to be electro-plated during the galvanic processing. In what we refer to as a suspension-electro-plating device, this is achieved by transmitting an oscillating rotational motion onto the vessel filled with the goods to be electro-plated which vessel is immersed into the electrolyte (see the announcement in *Galvanotechnik* Vol. 75, 1984, No. 11, page 1399). The electrolyte exchange is also improved at the same time by means of an oscillatory motion of the vessel containing the goods. Given an apparatus or facility comprising an electro-plating drum, rotation of the drum suffices for the moving and mixing of the goods to be electro-plated. The individual parts are conveyed upward to a greater or lesser distance toward the top dependent on the form and wall friction of the drum and then roll or slide back down. An apparatus for mass electro-plating should also be equipped with conveyor means for transporting the goods to be electro-plated through the electrolyte with either a continuous or interval-wise admission and removal of the goods for electro-plating being enabled by the conveyor means in combination with corresponding admission and exit stations. Finally, both the motion of the goods, and the mixing as well as the transporting of the goods through the electrolyte should be undertaken so that a gentle treatment of the goods is guaranteed and sensitive parts are likewise not mechanically damaged during the galvanic processing.

An apparatus or device is disclosed in U.S. Pat. No. 3,649,490 for electrolytic surface treatment of bulk goods and this apparatus largely meets the demands recited above. In this known device, a vibratory conveyor having a helically ascending conveyor track is provided for the transport of the goods for electro-plating through the electrolyte, whereas either a cylinder surrounding the vibratory conveyor or rods which are perpendicularly suspending into the treatment bath serve as the electrode. Although a uniform spread of the goods on the conveyor track will occur due to the vibrations transmitted to the bulk goods, a uniform current density on all parts cannot be achieved during the electrolytic surface treatment.

The problems recited in the context of mass electro-plating also occur in the same way or at least in an analogous way in other processes for electrolytic treatment of bulk goods. Electrolytic pickling in acids or caustic solutions, electrolytic degreasing in alkaline baths and electrolytic polishing are examples of these other processes. Dependent on the type of electrolytic surface treatment, the bulk goods are connected either to a cathode or an anode. In electrolytical polishing, for example, the goods are connected to an anode.

SUMMARY OF THE INVENTION

The object of the present invention is to improve an apparatus for electrolytically treating goods so that at least a largely uniform current density on all parts is guaranteed during the electrolytic surface treatment.

This object is achieved in an apparatus having a tank for the acceptance of the treatment bath, means for contacting the goods with one pole of an electrical source, at least one electrode arranged in the treatment bath and having an opposite polarity to the one pole in contact with the goods and at least one vibratory conveyor having a helically ascending conveyor track for the transport of the goods through the treatment bath. The improvement is that the electrode is arranged in a helical path at a constant distance from and parallel to the conveying track of the vibratory conveyor.

The invention is based on the perception that, precisely in view of the uniform spread of the bulk goods on the helical conveying track, the electrode must likewise be helically fashioned and be arranged at a distance parallel to the conveying track. An optimization of the current passage through the electrode arranged in the treatment space and the bulk goods will then occur. In addition, to providing an adequately large electrode surface, the electrode arrangement of the present invention provides an especially high and extremely uniform current density on all parts of the goods to be treated.

In accord with the preferred development of the invention, the goods are contacted via the conveying track of the vibratory conveyor. In comparison to a contacting on the basis of a multitude of button contacts or other contact elements, the direct contacting by the conveyor track composed of electrically conductive material offers the advantage in any electrolytes of a uniform current draw over the entire effective surface of the spread of the goods.

When the conveying track of the vibratory conveyor is provided with perforations, then the current passage to the goods to be treated can also proceed from below the conveyor track. In this case, a further improvement of the current passage is enabled when an auxiliary electrode, which is aligned at a distance parallel to the conveying track, is arranged in the treatment bath below the conveyor track.

The conveying track of the vibratory conveyor, as seen in the conveying direction, can also comprise at least one descending step. This step then acts as a stumbling step which leads to a further enhancement of the mixing of the goods with a gentle treatment of the goods.

Depending on the type of goods to be treated, it can be also advantageous under given conditions when a bath flow, which acts on the goods in the conveying direction, can be generated in the tank with the assistance of a circulating pump. In addition to a further improvement of the electrolytic exchange, a dampening of the conveyor caused by the electrolyte is thereby opposed and a promotion of the conveying on the basis of the electrolyte flow is achieved.

The apparatus or system of the invention can be operated under air exclusion with relatively little additional outlay and, for example, can be employed for electro-deposition of aluminum from oxygen-free and water-free, aluminum-organic electrolyte. In this case, the tank can be closed gas tight, and the space above the treatment bath is charged with an inert gas. In addition to the advantages also obtained in the aqueous treatment bath, the employment of a vibratory conveyor as the conveying means here has the particular, additional advantage that no drive shafts are conducted out of the treatment bath which shafts will need to be sealed. The sealing of rotational parts, which is necessary, for example, given the employment of conveyor belts and other known conveying means, is definitely to be considered problemmatically given the high demand raised, for example, in an aprotic bath liquid. An entrainment of gasses or vapors by the bulk goods is also reliably excluded in the apparatus operating under air exclusion as being excluded due to the vibration of the vibratory conveyor.

Exemplary embodiments of the invention are shown in the attached drawings and shall be set forth in greater detail hereinbelow.

BRIEF DESCRIPTION OF THE DRAWINGS

FIG. 3 is a cross sectional view illustrating the arrangement of anode and an auxiliary anode on both sides of a perforated conveyor track in accordance with the present invention.

DESCRIPTION OF THE PREFERRED EMBODIMENTS

Figure 1:
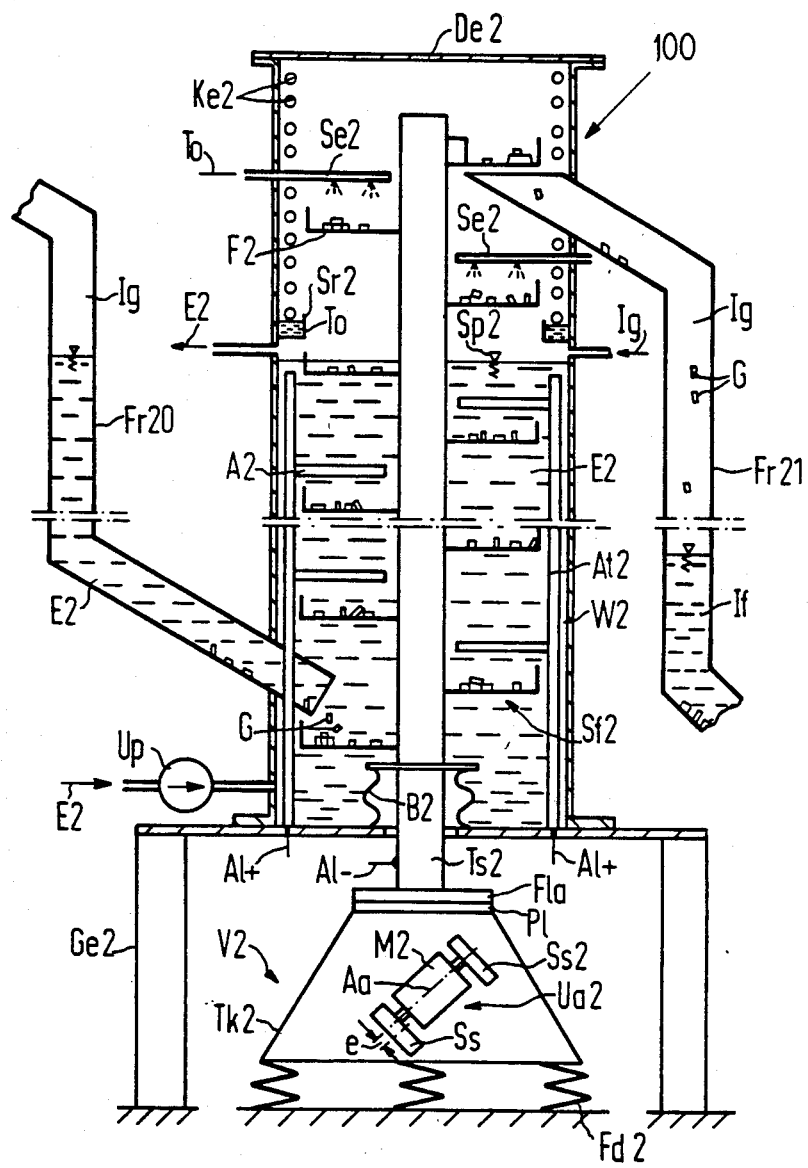
FIG. 1 is a vertical cross sectional view with portions in elevation for purposes of illustration of an embodiment of an apparatus for electro-depositing aluminum which is equipped with a helical vibrating conveyor.

The principles of the present invention are particularly useful when incorporated into a tower-shaped apparatus for electro-depositing of aluminum as generally indicated at 100 in FIG. 1. The apparatus 100 has a circular cylindrical tank W2, which is closed gas-tight by an upper cover De2 and is arranged on a frame Ge2. An aprotic, oxygen-free and water-free, aluminum-organic electrolyte E2 is situated in the tank W2. The region of the tank W2 lying above on upper level Sp2 of the electrolyte E2 is charged with inert gas such as, for example, nitrogen, which inert gas is fed into the tank through an inlet as indicated by an arrow Ig.

The goods G, which are to aluminized, and, for example, can be composed of bolts, nuts, screws, spacer bushings and the like, are introduced from above into the lower region of the tank W2 by an admission lock (not shown in the drawings) to a downpipe Fr20, whereby the downpipe Fr20 is filled with the electrolyte E2 up to the heighth of the level Sp2 and is charged with inert gas Ig thereabove. The admission locks can be those known and disclosed in the above mentioned U.S. patents, or can be of a structure disclosed in our copending U.S. patent application, Ser. No. 880,077, filed June 30, 1986. The goods introduced via the downpipe Fr20 then fall onto a lower end of a conveyor track F2 of a vibrating conveyor arranged within the tank W2 and generally indicated at Sf2. The conveying track F2 is fashioned as a vibrating conveyor and helically ascending so that the goods are transported up above the level Sp2 of the electrolyte E2 and then fall onto a funnel-shaped, upper end of a downpipe Fr21 which leads out of the tank W2. The downpipe Fr21 forms a downwardly leading leg of an exit lock fashioned as a U-shaped liquid lock, otherwise not shown in greater detail. The lower region of the downpipe Fr21, which is filled with an inert liquid If, such as, for example, toluol, while the space above the level of this liquid is charged with the inert gas Ig.

The conveying track F2 helically ascending within the tank W2 and fashioned as a vibrating conveyor is secured to a centrally arranged carrying column Ts2 whose lower end is fastened on a vibrator V2 which is centrally arranged within the frame Ge2. The passage of the carrying column Ts2 through the floor of the tank W2 is sealed by an elastic bellows B2, which is connected at one end to a plate placed on the carrying column Ts2 and on the other end to the floor of the tank W2. Due to the vibrator V2, the conveying track F2 is excited via the carrying column Ts2 to vibrations having a roughly helical motion. Due to the canted motion and the accelerations and speeds occurring from the vibrations, the goods G lying on the helical ascending conveyor track F2 have a canted projectile motion impressed upon them, so that the goods are transported in the conveying direction while gaining in heighth. Since the distance of the projectile motion and the heighth of the projectile motion are extemely slight, this type of conveying is a matter of a microprojectile motion conveying which guarantees an extremely gentle treatment of the goods G which are being aluminized. In the illustrated example, the carrying column Ts2 is rigidly connected to the downwardly conically expanding carrying member Tk2 of the vibrator V2. This connection is formed by a flange F1a and an electrically insulating plate P1. The carrying member Tk2 is seated in vibrational fashion on the foundation by a plurality of springs Fd2. An unbalanced drive Ua2 is arranged within the conical carrying member Tk2 and includes a motor M2 with a shaft Aa driving disk flywheels Ss and Ss2 which have adjustable eccentricity e and are arranged on both ends of the drive shaft of the motor. The drive shaft Aa of the motor M2 is inclined at an angle of, for example, 45° relative to a horizontal plane so that the unbalance of th disk flywheels Ss and Ss2 generate the afore mentioned vibrations having a roughly helical motion.

The bulk goods G are cathotically contacted via the conveyor track F2 because the conveyor track F2 is connected to a minus pole of an external voltage or electrical source via a carrying column Ts2 and a connecting line A1— extending from the column Ts2. In order to prevent an undesirable aluminum codeposition, the regions of the conveyor track F2 not coming in contact with the goods G and the carrying column Ts2 are coated with an enamel layer. A helically shaped anode A2 of pure aluminum is arranged in the region of the conveyor path of the goods G through the electrolyte E2. The anode A2 is arranged in a helical path at a distance parallel to the conveyor track F2. This anode A2 is secured to a rod-shaped anode carriers At2, which are positioned around the circumference of the tank, are vertically aligned and are connected to a plus pole of the external voltage source connecting lines A1+ conducted out of the tank W2 through an electrical insulation. The width of the anode A2 roughly corresponds to the width of the conveyor track F2 so that an anode surface which is very large in relation to the surface of the goods also occurs here and optimum conditions exist for the passage of electro-plating current. The electolyte exchange is intensified by the vibration of the potentially perforated carrier track F2. In order to further improve the electrolyte exchange, the electrolyte E2 can be withdrawn in the region of the level Sp2 and be re-introduced into the lower regions of the tank W2 adjacent the floor via a circulating pump Up so that this electrolyte circulation promotes the conveying of the goods G.

A spray means Se2 is arranged above the level Sp2 of the electrolyte bath E2. This spray means Se2 sprays a solvent To compatible with the electrolyte E2 onto the fully aluminized goods G in the region of the upper most turns of the conveyor track F2 and, thus, frees the goods G of electrolyte residues which are still adhering to the surfaces of the goods. This solvent is of a material, such as toloul which is contained in the electrolyte E2 and is condensed at a condensation means Ke2 arranged above the level Sp2 in the tank W2. The toloul, which is condensed on the condensation means Ke2, is collected in a collecting channel Sr2 and is supplied to a spray means S2 via a circulating pump (not illustrated).

The apparatus or device 100 of FIG. 1 is operated in a throughput with continuous charging and removing of the goods G, whereby the conveying speed and the length of the conveying track F2 are selected so that the aluminum deposition is achieved to the desired layer thickness at the heighth of the level Sp2 for the bath E2.

Figure 2:
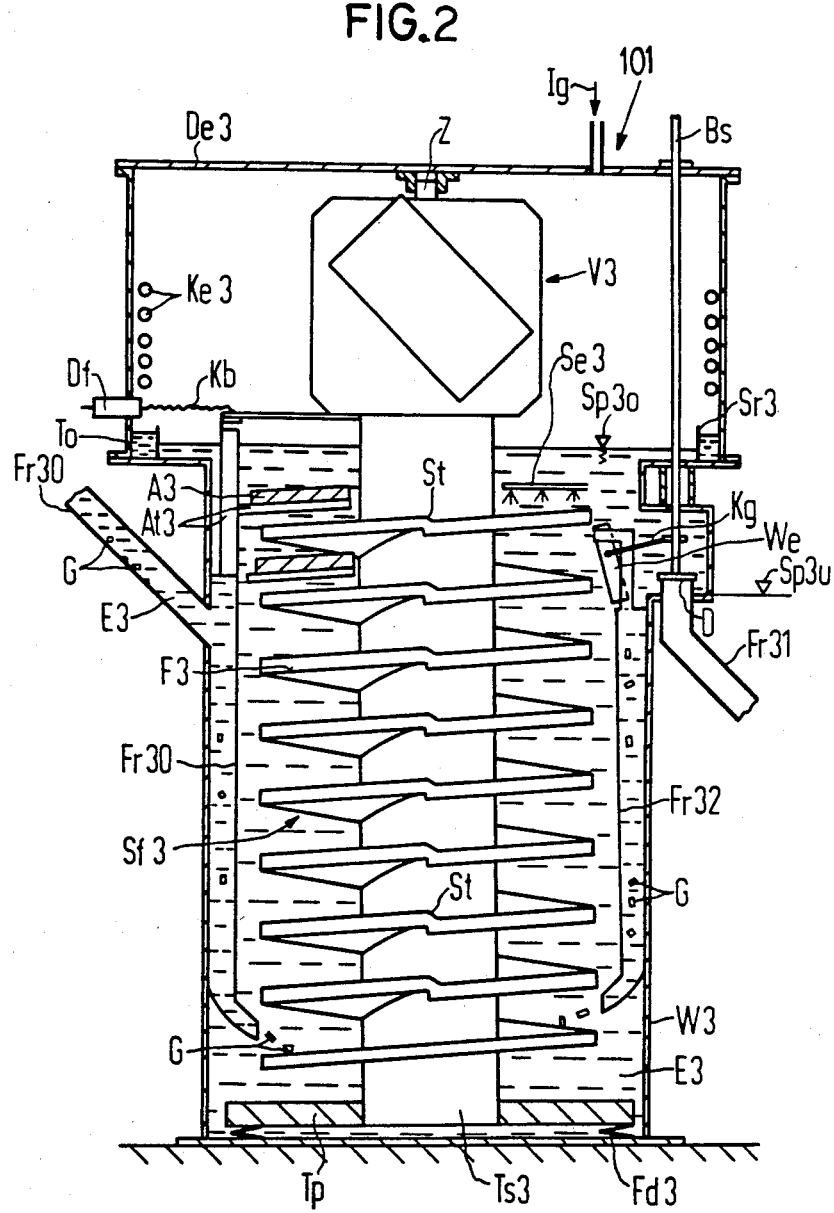
FIG. 2 is a vertical cross sectional view with portions in elevation for purposes of illustration of a second embodiment of an apparatus for electro-depositing aluminum, which apparatus is equipped with a helically vibrating conveyor.

A second embodiment of a tower-shaped apparatus for electro-deposition of aluminum is generally indicated at 101 in FIG. 2. The apparatus 101 has a circular cylindrical tank W3 closed gas-tight with the assistance of a cover De3 and arranged directly on the ground or floor. An aprotic, oxygen-free and water-free, aluminum-organic electrolyte E3 is situated in the tank W3. The region of the tank W3 lying above the level Sp3o of the electrolyte or bath E3 is charged with inert gas, such as, for example, nitrogen, whereby the feed of this inert gas to an inlet is indicated by the arrow Ig.

The goods G to be aluminized are introduced via an admission lock (not shown in the drawings) and a downpipe Fr30 and then fall onto a lower end of a conveyor track F3 of a vibratory conveyor arranged in the tank W3 and generally indicated at Sf3. On the conveying track F3, which is fashioned as a helically ascending vibrating conveyor, the goods G are transported up through the electrolyte E3 and then fall onto a switch We fashioned as a short channel. On the way up, the goods pass a plurality of descending steps St of the conveyor track F3 whose step heighth is dimensioned such that the goods G turn when they fall over the step. This falling allows improved mixing of the goods. In the position of the switch We shown in FIG. 2, the goods proceed into a downpipe Fr32 serving as a return means, which returns the goods G back to the lowest turn of the conveyor track F3. In the illustrated position of the switch We, the goods G are, thus, conveyed through the electrolyte E3 and then returned to be reconveyed for a following pass or time. Before throwing the switch We, the level Sp3o of the electrolyte E3 is lowered to a lower level Sp3u which lies below an upper opening of a downpipe Fr31, which is provided for the discharge of the goods G. The lowering of the electrolyte level can, for example, be undertaken by a circulation pump which will remove the material and place it in a storage vessel (not illustrated) which vessel is charged with an inert gas. In order to prevent an outflow of the electrolyte E3 through the downpipe Fr31 of the discharge station at a given an elevated level Sp3o, the upper opening thereof is close by a cover D. The opening and closing of the downpipe by moving this cover D can be pneumatically or hydraulically undertaken via an actuation rod Bs which is conducted out of the upper end of the tank as illustrated. The switch We is hinged and connected by a coupling element Kg to the rod Bs so that raising the actuation rod Bs will throw the switch to a position to discharge the goods G into the downpipe Fr31 and into the discharge lock which is not illustrated.

The helical conveying track F3 is fastened to a centrally arranged carrying column Ts3 whose lower end is vibrationally seated on the floor of the tank W3 via a carrying plate Tp and a plurality of springs Fd3. The upper end of the column Ts3 supports a vibrator V3 in a region lying above the elevated liquid level Sp3o. The vibrator V3, which is not shown in greater detail in terms of its function, is thereby rotatable in the covered De3 via a trunnion or bearing Z which allows for centering by raising and lowering to a slight degree.

The bulk goods G are cathodically contacted via the conveyor track F3 because the conveyor track F3 is connected to a minus pole of an external current source via a carrying column Ts3 and a connecting means not shown. A helical anode A3 is arranged at a given distance to extend parallel to the conveyor track and is illustrated only in the upper regions of the upper turns for purposes of illustration. The fastening of the anode A3, which can be composed of a plurality of helical segments, occurs via an anode carrier At3, which is also only illustrated in the upper portion of the drawing for purposes of illustration, and is connected to the plus pole of the external voltage source via a cable Kb and a gas-tight electrically insulated feedthrough Df.

Spray means Se3, only one being shown in the drawing, are arranged above the lower level Sp3u of the electrolyte E3. This spray means will spray the toluol To condensed at a condensation means Ke3 and collected in the collecting channel Sr3 onto the goods G during a discharge phase to wash the electrolyte residues which are still adhering off of the surfaces of the goods.

The apparatus 101 is charged batch-wise with the goods G and is operated in a circulation until the aluminum deposition has reached the desired layer thickness. After this, the electrolye E3 is lowered to the lower level Sp3u, the switch We is thrown given simultaneous removal of the cover D and the completely aluminized goods G cleaned with the assistance of the spray means Se3 are discharged. Due to the circulation operation, significantly lower structural heights can be used for the apparatus 101 than are required for the apparatus 100 of FIG. 1.

A conveying track F, which is illustrated in FIG. 3 and is provided with perforations P, is for conveying bulk goods G through an electrolyte. An anode A of pure aluminum is arranged above the conveyor track F and aligned to extend parallel to the surface of the track at a given distance therefrom. An auxiliary anode ZA of pure aluminum is arranged under the conveying track F and is aligned to extend parallel thereto at a distance therefrom. This auxiliary anode ZA causes an additional current passage to the goods G through the perforations P. In addition to the further improvement of the current passage, the perforations P, which are provided in the conveyor track F, also have the additional advantage that it further improves the electrolyte exchange and promotes the drying of the goods G when the track extends above the bath.

The arrangement of the anode A and the auxiliary anode ZA on both sides of the conveying track F which is provided with the perforations P, as shown in FIG. 3, can be applied to the conveying tracks F2 of the apparatus 100 of FIG. 1 and F3 of the apparatus 101 of FIG. 2. The auxiliary anode ZA will be helically fashioned just like the anode A2 or A3.

Although various minor modifications may be suggested by those versed in the art, it should be understood that we wish to embody within the scope of the patent granted hereon, all such modifications as reasonably and properly come within the scope of our contribution to the art.

We claim:

1. In an apparatus for electrolytic surface treatment of bulk goods, said apparatus including a tank for the acceptance of the treatment bath, means for contacting the goods with one pole of an electrical source, at least one electrode arranged in the treatment bath and having an opposite polarity to the polarity of one pole and at least one vibrator conveyor having a helically ascending conveyor track for the transport of the goods through the treatment bath, the improvements comprising the electrode being arranged at an equal distance to the conveying track to extend parallel to surface of the conveying track of the vibratory conveyor.

2. In an apparatus according to claim 1, wherein the conveying track of the vibratory conveyor is provided with perforations.

3. In an apparatus according to claim 2, which includes an auxiliary electrode being provided in the treatment bath under the conveying track at an equal distance and aligned to extend parallel to the conveying track.

4. In an apparatus according to claim 3, wherein the conveying track of the vibratory conveyor comprises at least one descending step as seen in the conveying direction.

5. In an apparatus according to claim 3, which includes means for circulating the electrolyte including an outlet connected to a circulating pump which discharges to an inlet for the tank, said inlet and outlet being arranged in the tank to create a flow extending in the conveying direction to assist in conveying the goods through the apparatus.

6. In an apparatus according to claim 3, wherein the tank is closed gas-tight and the tank has means above the level of the treatment bath for introducing an inert atmosphere.

7. In an apparatus according to claim 1, wherein the means for contacting the goods comprises the conveying track being connected to the one pole of the electrical source.

8. In an apparatus according to claim 7, wherein the conveying track of the vibratory conveyor is provide with perforations.

9. In an apparatus according to claim 8, which includes an auxiliary electrode being provided in the treatment bath under the conveying track at an equal distance to extend parallel to the conveying track.

10. In an apparatus according to claim 8, wherein the conveying track has at least one descending step as seen in the conveying direction.

11. In an apparatus according to claim 8, wherein the tank includes means for creating a flow of electrolyte through the tank, said means including a circulation pump discharging to an inlet of the tank and receiving the electrolyte from an outlet, said inlet and outlet being arranged so that the flow of electrolyte through the tank is in the direction of conveying to assist the conveying of the goods through said tank.

12. In an apparatus according to claim 8, wherein the tank is closed gas-tight and the apparatus includes means for charging a space above the level of electrolyte with an inert gas.

13. In an apparatus according to claim 7, wherein the conveying track of the vibrating conveyor is provided with at least one descending step as seen in the conveying direction.

14. In an apparatus according to claim 7, wherein the apparatus includes means for creating a flow of the bath through the tank, said means including a circulating pump connected to an outlet of the tank and discharging into an inlet for the tank, said inlet and outlet of the tank being arranged so that the flow is through the tank in the direction of conveying of the goods therethrough.

15. In an apparatus according to claim 7, wherein the tank is closed gas-tight and has means for introducing an inert gas in the space above the level of the bath in said tank.

16. In an apparatus according to claim 1, wherein the conveying track of the vibratory conveyor has at least one descending step as seen in the conveying direction.

17. In an apparatus according to claim 1, which includes means for creating a bath flow in the tank including a circulating pump connected between an inlet and an outlet for the tank, said inlet and outlet being arranged so that the flow in the tank is in the conveying direction of the goods through said tank.

18. In an apparatus according to claim 1, wherein the tank is a closed tank and has means for charging an inert gas in the tank in the space above the level of the treatment bath.

* * * * *